United States Patent [19]
Peters

[11] Patent Number: 5,702,769
[45] Date of Patent: Dec. 30, 1997

[54] METHOD FOR COATING A SUBSTRATE WITH A SLIDING ABRASION-RESISTANT LAYER UTILIZING GRAPHITE LUBRICANT PARTICLES

[75] Inventor: John Antony Peters, Winterthur, Switzerland

[73] Assignee: Sulzer Innotec AG, Winterthur, Switzerland

[21] Appl. No.: 579,751

[22] Filed: Dec. 28, 1995

[30] Foreign Application Priority Data

Feb. 2, 1995 [EP] European Pat. Off. ......... 95810072

[51] Int. Cl.$^6$ ..................................... C23C 4/06
[52] U.S. Cl. ................... 427/451; 427/450; 427/455; 427/456
[58] Field of Search ....................... 427/450, 451, 427/453, 455, 456

[56] References Cited

U.S. PATENT DOCUMENTS

| | | | |
|---|---|---|---|
| 3,468,699 | 9/1969 | Kremith . | |
| 3,539,192 | 11/1970 | Prasse | 427/451 |
| 4,728,448 | 3/1988 | Sliney | 252/12 |
| 5,358,753 | 10/1994 | Rao et al. | 427/455 |

FOREIGN PATENT DOCUMENTS

| | | |
|---|---|---|
| 0 622 471 | 11/1994 | European Pat. Off. . |
| 1 771 640 | 1/1972 | Germany . |
| 2 273 109 | 6/1994 | United Kingdom . |
| 94/02023 | 1/1995 | WIPO . |

OTHER PUBLICATIONS

Patent Abstracts of Japan, vol. 10 No. 390 (C–394), Dec. 26, 1986 & JP–A–61 177400 (Riken Corp), Abstract.

Patent Abstracts of Japan, vol. 8, No. 230 (M–333), Oct. 23, 1984 & JP–A–59 110702 (Shiyouwa Aruminiumu) Jun. 26, 1984, Abstract.

Thermal Spray: International Advances in Coating Technology, "Influence of Different gases on the Mechanical and Physical Properties on HVOF Sprayed Tungslen Carbide Cobalt", Kraak, et al, May/Jun. 1992, pp. 153–158.

*Primary Examiner*—Katherine A. Bareford
*Attorney, Agent, or Firm*—Townsend and Townsend and Crew LLP

[57] ABSTRACT

A composite coating (1) resistant to wear is applied onto a substrate (2) and contains a mixture of hard material particles (3) and particles (5) of a solid lubricant (6). The particles (3, 5) are incorporated in a binder alloy (4). The lubricant particles are each enclosed by a protective envelope (7). The protective envelope substantially prevents bonding between components of the lubricant (6) on the one hand and components of the binder alloy (4) as well as of the hard material particles (3) on the other hand.

8 Claims, 1 Drawing Sheet

METHOD FOR COATING A SUBSTRATE WITH A SLIDING ABRASION-RESISTANT LAYER UTILIZING GRAPHITE LUBRICANT PARTICLES

BACKGROUND OF THE INVENTION

The invention relates to a composite coating resistant to sliding abrasion which is disposed on a substrate and includes a mixture of hard material particles and particles of a solid lubricant incorporated in a binder alloy.

A composite coating is known from EP-A-0 265 800 in which particles of hard material, namely particles of chromium carbide or chromium boride, are incorporated or embedded in a matrix of copper or copper alloy. The proportion of the matrix preferably amounts to 5 to 15 percent by weight. The coating is for example produced by means of a thermal spray process by using a spray powder, with the particles of the powder including both hard material phases as well as matrix material. A further material in powder form can be admixed to this homogeneous spray powder which endows the protective layer with self-lubricating properties. A cobalt-nickel alloy is proposed as an example for a material of this kind.

This known composite layer is for example usable as a running layer for piston rings in large-capacity Diesel motors. For a good dynamic and sealing behavior of piston rings in interplay with the cylinder sleeves an optimum selection running layer material of the piston ring should be made, wherein the following factors are to be taken into account:

a) The wear on the rings and cylinder bushes should be as small as possible;

b) In the presence of insufficient lubrication, as little adhesive wear should occur as possible; i.e. the "danger of scuffing" should be small or, in other words, the layer should be "scuff resistant" ("scuff resistance" corresponds to the German term "Brandspursicherheit");

c) Furthermore, no fatigue-induced break-outs should occur;

d) Finally, a suitable solid lubricant should be stored in the layer in case a deficient lubrication situation arises.

SUMMARY OF THE INVENTION

It is a general object of the invention to provide a composite layer which is superior to the known layer so that advantages in relation to the requirements a) to d) listed above are realized.

A very resistant composite layer is known in which tungsten carbide, WC, serves as the hard material and the particles of hard material are cemented together by a matrix of a cobalt-chromium alloy. This matrix or binder alloy has a lubricating effect but one which is inadequate under conditions of insufficient lubrication. The admixing of a solid lubricant is thus necessary. In one attempt to use graphite as a lubricant, the chromium of the binder alloy formed carbide with the carbon of the graphite which, in turn, negatively influenced the properties of the layer.

This problem is solved in accordance with the invention by using lubricant particles which are individually enclosed by a protective envelope or sheath. Protective envelopes of this kind prevent quite generally the formation of a bond between components of the lubricant and components of the binder alloy—as well as of the particles of hard material. Even when the protective envelopes are not completely intact, the formation of the named composites is still substantially prevented.

Advantageous embodiments of the invention provide that machine components, for example piston rings, bearings or seals of turbo-machines (i.e. turbines, pumps etc.) be coated with the protective layers of the invention. This may include a thermal spray process for applying the protective layers.

In order to produce an optimum coating, a test program comprising a plurality of sub-tests has to be carried out. A comprehensive multiplicity of parameters needs to be varied in these tests. In the thermal spray process claimed, this plurality includes the following parameters: the composition of the spray powder, this being a mixture of particles of hard material/binder alloy on the one hand and lubricant particles on the other hand; the proportion of oxygen to fuel gas; the powder supply rate; the relative speed between the spray nozzle and the substrate; the distance between the nozzle and the substrate.

The proportion of spray powder effectively incorporated into the coating is measured. The loss should of course turn out to be as small as possible. The samples obtained are examined with regard to the following properties: the relationship or ratio between the phases of hard material, binder alloy and lubricant; the roughness of the layer surface; hardness (Vickers pyramid the hardness $HV_{0.3}$ which is a measure for the penetration depth of a diamond tip under a load of 0.3 kg); and the porosity.

Abrasion tests are performed to determine the wear resistance. In these tests, a pin is pressed with a predetermined load against a rotating plate. The coating to be tested thus forms the contact surface of the pin and its wear rate is measured. In the tests, the critical load for the onset of "scuff tracks" is determined.

One obtains good results with a HVOF process (HVOF= High Velocity Oxy-Fuel), i.e. with a thermal spray process in which the spray powder is applied onto the substrate by burning off a mixture of oxygen and fuel gas at high speed. Propane is used as the fuel gas with the proportion of oxygen to propane being in the range of between approximately 5 and 10. A 100 mm nozzle is employed (Sulzer Metco CDC Standard 100 mm nozzle, CDS=Continuous Detonation Spraying).

In the tests carried out, the following composition for the powder mixture is selected: 84 weight-percent WC 10Co 4 Cr (where the portions of WC, Co and Cr amount to approximately 86, 10 and 4 weight percent respectively) and 16 weight percent Ni $25C_{graphite}$ (=graphite particles with nickel envelopes having a proportion of carbon amounting to 25 weight percent).

With a particular statistical method ("fractional factorial experimental design", see e.g. W. G. Hunter, J. S. Hunter "Statistics for Experimenters—An Introduction to Design, Data Analysis and Model Building", J. Wiley & Sons, 1978) it is possible to find the parameter values for which an approximately optimum coating is to be expected with a test series of only eight tests. The following values were obtained using this method:

Proportion of oxygen to fuel gas=7.0; supply rate of the powder=35 g/min; relative speed between spray nozzle and substrate=72 m/min; distance between nozzle and substrate 250 mm.

This choice of parameters is associated with the following values: loss of spray powder=26% (i.e. application rate 74%); Vickers pyramid hardness $HV_{0.3}$=859; proportion of the graphite phase=8 percent by volume (value estimated on the basis of X-ray measurements); proportion of WC and $W_2C$=5.2 (estimate as for graphite). The abrasion test with pin and rotating disk showed the onset of adhesive wear ("scuff track") at room temperature at 88 N/mm$^2$. The corresponding value at 220° C. amounts to 59 N/mm$^2$. The values are approximately 20% better than those for a corresponding coating with 100% WC 10Co 4Cr, i.e. in the absence of the lubricant components.

During the thermal spray process a part of the WC is converted into W$_2$C. This conversion has a negative influence on the wear resistance of the hard material phase. It has been shown that during spraying a part of the graphite changes into the vapor phase. The vaporized carbon exerts advantageously a moderating influence on the conversion of WC by which the production of unfavored W$_2$C is hindered.

Further details of the invention are described below.

DESCRIPTION OF THE PREFERRED EMBODIMENTS

Figure 1:
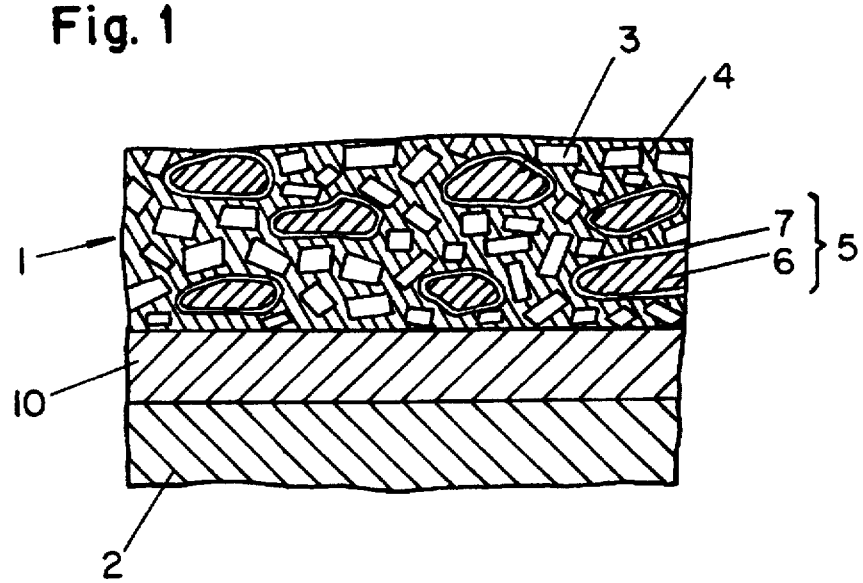
FIG. 1 is a section through a coating in accordance with the invention.

The composite layer 1 resistant to sliding abrasion shown in FIG. 1 is connected to a substrate 2 via an intermediate layer 10. The composite layer 1 is comprised of a mixture of particles 3 of hard material (drawn in an exaggeratedly large scale) and particles 5 containing a solid lubricant. The particles 3 and 4 are embedded or incorporated in a binder alloy 4. Each particle 5—see FIG. 2—comprises a lubricant particle 6 and a protective envelope or sheath 7. The intermediate layer 10 is free of lubricant particles and effects a good bonding of the layer 1 to the substrate 2. In many cases, an intermediate layer 10 can be dispensed with.

Figure 2:
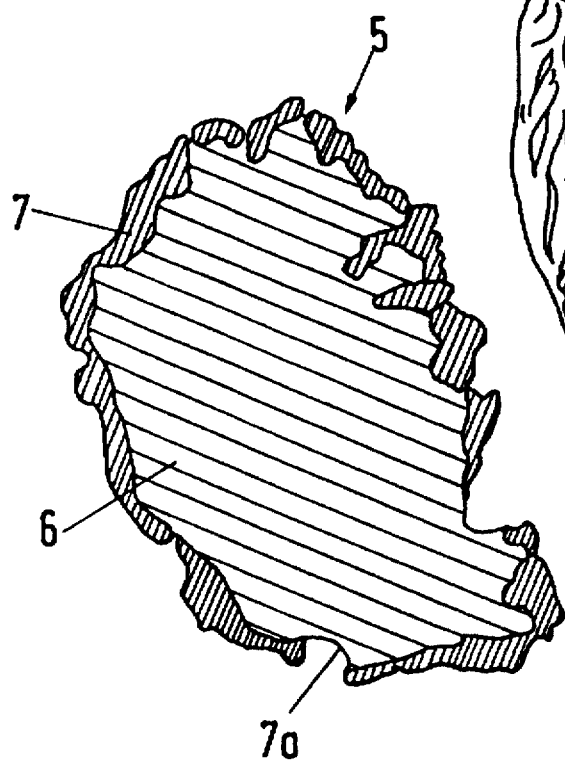
FIG. 2 shows a Ni 25C$_{graphite}$ particle with a cut-away side surface.

In the concrete example of FIG. 2, the lubricant is formed by platelet-shaped graphite particles 6 having a diameter in the range of between approximately 10 and 30 µm and a height in the range of between approximately 5 and 10 µm. The envelope 7 (produced with a so-called "Sherritt Gordan Process") is made of nickel and includes approximately 75% of the entire particle 5. The protective envelope 7 of the graphite particles 6 can quite generally be formed from a metallic phase in which the metal is non-carbide forming, wherein in particular Co, Ni, Cu and/or Mo can be considered for the metals. The envelopes 7 can also have gaps 7a via which a small amount of carbon is converted into the vapor phase during the thermal spray process.

The lubricant particles must be homogeneously distributed in the layer. The graphite phase should compose at the most 20% by volume so that no substantial weakening of the layer occurs. The presence of the graphite phase improves the workability of the layer surface.

A Ni 25C$_{graphite}$ powder is used with particles which have a size distribution with the following screen analysis: −88 +44 µm (i.e. 5% coarser than 88 µm, 2 % finer than 44 µm).

Figure 3:
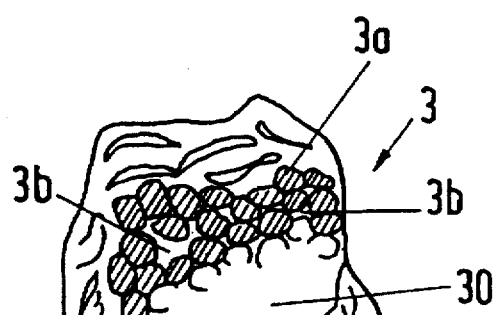
FIG. 3 shows a WC 10Co 4Cr particle also with cut-away side surface.

FIG. 3 shows, to the same scale as FIG. 2, a surface ground powder grain (ground surface 30) made up of hard material particles 3a (WC) and binder alloy 3b (10Co 4Cr). The binder alloy 3b forms a matrix comprised of Co as well as Cr with the weight-related proportion of Co being a factor of 2.5 larger than that of Cr. This matrix has a lower pore density and an inherently good wear resistance. Instead of the named composition, another composition can also-be selected. For example, the matrix can be made up of Co, CoCr, Mo or a mixture of these materials. The hard material phase can be formed by carbides, nitrides or carbon nitrides of the metals W, Cr, Ti, Ta, Mo, Nb, Zr, Hf and V.

The powder particles 3 containing the phases of hard material and binder alloy can be produced by sintering of the components and subsequent comminution of the sintered product. The particle sizes of the powder used is characterizable by the following screen analysis: −45 +11 µm. Ten to twenty weight percent of the spray powder can be the lubricant particles.

What is claimed is:

1. A thermal spray process for coating a substrate with a sliding abrasion resistant layer for providing the substrate with resistance to wear comprising the steps of forming solid, graphite lubricant particles; surrounding the lubricant particles with a protective layer of a non-carbide forming metal such that the resulting lubricant particles have approximately 25 weight percent of graphite; mixing the resultant lubricant particles with a binder and other particles made from a relatively hard material into a spray powder so that the resulting lubricant particles comprise about 10 to 20 weight percent of the powder; and spraying the powder onto the substrate to form the coating.

2. A process according to claim 1 wherein the non-carbide forming metal is selected from a group of metals consisting of Co, Ni, Cu, Mo and alloys thereof.

3. A process according to claim 1 wherein the step of forming solid graphite lubricant particles comprises shaping the solid lubricant particles so that they have a lateral dimension in the range of between approximately 10 and 30 µm and a height in the range between approximately 5 and 10 µm.

4. A process according to claim 1 wherein the step of applying comprises heating the spray powder by subjecting it to heat derived from a high velocity oxygen-fuel combustion process.

5. A process according to claim 4 wherein the fuel gas comprises propane.

6. A process according to claim 1 including the steps of forming the other particles and the binder by sintering and subsequently comminuting them prior to mixing with the resulting lubricant particles.

7. A process according to claim 6 wherein the other particles comprise at least one of carbides, nitrides and carbonitrides of at least one metal selected from a group of metals consisting of W, Cr, Ti, Nb, Zr, Hf, Ta and Mo.

8. A process according to claim 7 wherein the other particles comprise WC, Co and Cr in the amounts of approximately 86, 10 and 4, respectively, weight percent.

* * * * *